United States Patent
Matsuoka

[11] Patent Number: 5,927,418
[45] Date of Patent: Jul. 27, 1999

[54] POWER TRANSMISSION DEVICE IN A FLUID PRESSURE ACCUMULATING HYBRID VEHICLE

[75] Inventor: Yoshihiro Matsuoka, Neyagawa, Japan

[73] Assignee: EXEDY Corporation, Neyagawa, Japan

[21] Appl. No.: 08/870,589

[22] Filed: Jun. 6, 1997

[30] Foreign Application Priority Data

Jun. 13, 1996 [JP] Japan .................................. 8-152481

[51] Int. Cl.$^6$ ............................................ B60K 8/00
[52] U.S. Cl. ..................... 180/165; 192/85 CA
[58] Field of Search .................... 180/165, 305, 180/307; 192/89.23, 85 CA

[56] References Cited

U.S. PATENT DOCUMENTS

| | | | |
|---|---|---|---|
| 4,242,922 | 1/1981 | Bandoin | 180/165 |
| 4,401,182 | 8/1983 | Pollman | 180/307 |
| 5,054,598 | 10/1991 | Tojima | 192/89.23 |
| 5,086,865 | 2/1992 | Tanaka et al. | 180/165 |
| 5,088,041 | 2/1992 | Tanaka et al. | 180/165 |
| 5,377,803 | 1/1995 | Link et al. | 192/89.23 |

FOREIGN PATENT DOCUMENTS 451611  10/1948  Canada .............................. 192/85 CA

*Primary Examiner*—Lanna Mai
*Assistant Examiner*—Bridget Avery
*Attorney, Agent, or Firm*—Shinjyu An Intellectual Property Firm

[57] ABSTRACT

In a pressure accumulating hybrid vehicle, a power switching device (5) is interposed between tires (2) of the vehicle and a hydraulic pump/motor (6). The vehicle includes a drive shaft (10) for transmitting a braking torque from tires (2) to the hydraulic pump/motor (6), and a clutch device (11) provided between the drive shaft (10) and a sub-input portion (22) of the power switching device (5). A clutch disc assembly (31) included in the clutch device (11) has an outer diameter three to five times greater than an outer diameter of the drive shaft (10) and a frictional member (40) brought into contact with a frictional surface (30c) of the power transmission member (30)

6 Claims, 2 Drawing Sheets

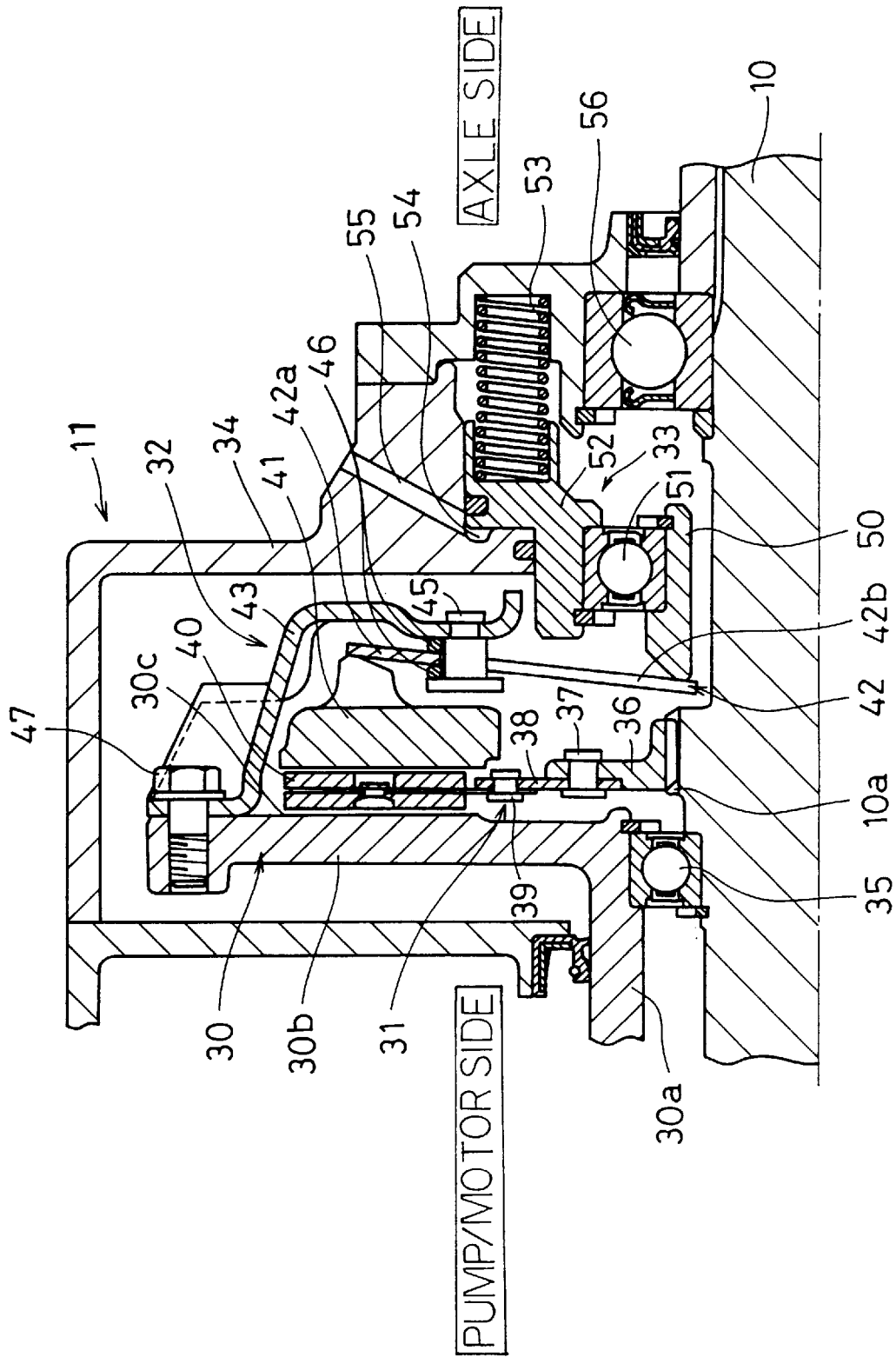

POWER TRANSMISSION DEVICE IN A FLUID PRESSURE ACCUMULATING HYBRID VEHICLE

BACKGROUND OF THE INVENTION

1. Field of the Invention

The present invention relates to a power transmission device, and more particularly to clutch device in a power transmission device of a hybrid vehicle which includes a fluid pressure generating mechanism that absorbs energy in the form of braking torque from the vehicle's tires during deceleration of the vehicle.

2. Description of the Related Art

Pressure accumulating hybrid vehicles are motorized vehicles that are configured to absorb energy in the form of braking torque from the vehicle's tires during deceleration of the vehicle. The absorbed energy is then used for starting motion of the vehicle again. The vehicle includes a hydraulic,pump/motor that is mechanically connected to the vehicle tires. In such a pressure accumulating hybrid vehicle, the hydraulic pump/motor is driven by braking torque from the vehicles tires during deceleration or braking The braking torque is directed to the hydraulic pump/motor which, during deceleration, serves as a hydraulic pump thereby accumulating fluid pressure Then, when starting motion of the motor vehicle, the energy accumulated from braking torque during deceleration is utilized to rotate the hydraulic pump/motor, which now serves as a hydraulic motor. The drive force of the hydraulic motor is utilized as an auxiliary drive force to rotate the tires.

In the pressure accumulating hybrid vehicle described above, the hydraulic pump/motor is mechanically connected to the tires of the vehicle at all times and therefore is driven during regular motion of the vehicle. Consequently, the hydraulic pump/motor creates an energy consuming load whenever the vehicle is in motion.

In order to selectively interrupt transmission of torque to the hydraulic pump/motor, a clutch device could be provided between the hydraulic pump/motor and the tires. In general, a solenoid clutch or the like would appear to be suitable for the clutch device. However, since the solenoid clutch is heavy in weight and is generally an expensive component, it is not suitable, since by their very nature such hybrid vehicles are meant to reduce costs. In particular, in case of a large size vehicle such as a bus, since the forces associated with braking torque may be extremely large, it is very difficult to inexpensively design a clutch device which may transmit a large amount of torque, and yet keep the weight of the clutch light in weight and remain inexpensive.

Another possible solution is a power switching device which may effect gear engagement and disengagement between wheels and the hydraulic pump/motor. Such a gear device might be utilized for transmission and interruption of torque transmission in place of a clutch device. The torque is transmitted directly by the engagement of gears and therefore device may be made relatively small in size. However, it is necessary to disengage the gears during the regular motion of the vehicle and engage the gears with each other when the braking is effected during traveling in order to decelerate. The system suffers in that a shock or jolt may be experienced during the engagement of the gears and it is difficult to smoothly perform the engagement of the gears.

SUMMARY OF THE INVENTION

An object of the invention is to reduce drag forces and unnecessary loads during motion of a pressure accumulating hybrid vehicle.

Another object of the invention is to perform a smooth power switching operation in a power switching device that is interposed between wheels and a pressure accumulating device in a pressure accumulating hybrid vehicle.

In accordance with one aspect of the present invention, a power transmission device for a pressure accumulating hybrid vehicle, includes a pressure accumulating hybrid vehicle having wheels supported thereon. The wheels are configured for mechanical connection to a rotary power source. The invention also includes a power switching device having a main input portion, a sub-input portion, an output portion, and a switching portion, the switching portion being mechanically connected to the output portion, the switching portion being configured to selectively mechanically connect the output portion to one of the main input portion and the sub-input portion, the output portion being mechanically connectable to a hydraulic pump/motor. A drive shaft is mechanically connected to the wheels and to the main input portion of the power switching device. A clutch device has an input and an output, the input of the clutch device being mechanically connected to the drive shaft and the output of the clutch device connected to the sub-input portion of the power switching device. The clutch device includes a power transmission member having a shaft portion connected at one end to the sub-input portion of the power switching device and a disc-like flange portion provided at the other end of the shaft portion and having a frictional surface. A clutch disc assembly has a frictional member having an outer diameter three to five times greater than an outer diameter of the drive shaft and the frictional member is configured to contact the frictional surface of the power transmission member. An inner circumferential portion of the clutch disc assembly is engaged for rotation with the drive shaft. A pressure mechanism for pressing the frictional member against the frictional surface of the power transmission member is also included. A release mechanism controls the pressure of the pressure mechanism Preferably, the pressure mechanism includes a pressure plate arranged opposite to the frictional surface of the power transmission member with the frictional member disposed therebetween. A biasing member biases the pressure plate toward the power transmission member. A clutch cover is fixed to the flange portion of the power transmission member so as to cover the pressure plate and the biasing member, the clutch cover supporting the biasing member and supporting the pressure plate to be relatively non-rotatable but movable in the axial direction.

Preferably, the release mechanism includes a spring biased against the force of the biasing member such that the pressure plate is biased toward disengagement with the clutch disc assembly, and a pressure device for selectively effecting compression of the spring to force the pressure plate into engagement with the clutch disc assembly.

The power transmission device is used in a pressure accumulating hybrid vehicle where brake torque from the tires of the vehicle is accumulated in a pressure accumulating device. The energy stored from the brake torque is later used to provide rotary power to the tires when motion begins again.

In the device of the present invention, during a regular travel mode, in the power switching device, the sub-input portion and the output portion are mechanically connected to each other awaiting torque transmission. However, in a regular travel mode the clutch device is in a disengaged state, so no torque is transmitted through the sub-input portion to the output portion. When brakes are applied, the device enters a braking mode. In the braking mode, the clutch device is moved to an engaged state and torque is transmitted through the clutch device to the sub-input portion. Thereafter, the rotations of the main input. portion, the sub-input portion and output portion of the power switching device become synchronized with each other. Under this condition, the switching portion is re-set such that the main input portion and the output portion are connected to each other and the sub-input portion is disconnected from the output portion. Thus, the braking torque is directly transmitted to the pressure accumulating device without intervention of the clutch device. Thus, the braking torque is accumulated in the pressure accumulating device as fluid pressure.

In a start mode, power accumulated by the pressure accumulating device may then be transmitted through the output portion and the main output portion to the wheels. The main input portion and the output portion are connected to each other. Thus, the energy accumulated during braking may be used as an auxiliary drive force to power the wheels.

Thereafter, in the regular travel mode, the switching portion is re-set such that the main input portion and the output portion are disengaged from torque transmission therebetween, the sub-input portion and the output portion are again connected to each other, and the clutch device is disengaged. Thus, in the regular travel mode, the pressure accumulating device does not create any load or drag on the wheels.

In the present invention, the clutch device transmits the torque only until the main input portion of the power transmission device and the output portion are rotating at a synchronous speed during braking mode. However, after synchronous, the switching portion is reset so that torque transmission is performed by the connection between the main input portion and output portion, and the torque is directly transmitted to the pressure accumulating device from the wheel side without intervention of the clutch device. Accordingly, the torque transmission capacity of the clutch device may be minimal. The outer diameter of the frictional member is therefore preferably three to five times greater than the outer diameter of the drive shaft. For this reason, it is possible to form the clutch device which is light in weight and less expensive Also, by using the clutch device, it is possible to make the clutch device, the sub-input portion and the switching portion function as a synchronizing device of the power switching device. It is possible to reduce a shocks or jolts during switching in the power switching device.

Furthermore, in such a clutch device, it is possible to use an automotive dry type clutch device, which may realize the clutch device in less expensive manner.

These and other objects, features, aspects and advantages of the present invention will become more fully apparent from the following detailed description of the present invention when taken in conjunction with the accompanying drawings where like reference numerals denote corresponding parts throughout the figures.

BRIEF DESCRIPTION OF THE DRAWINGS

In the accompanying drawings

FIG. 2 is a cross-sectional view showing a clutch device according to one embodiment of the present invention.

DESCRIPTION OF THE PREFERRED EMBODIMENTS

Figure 1:
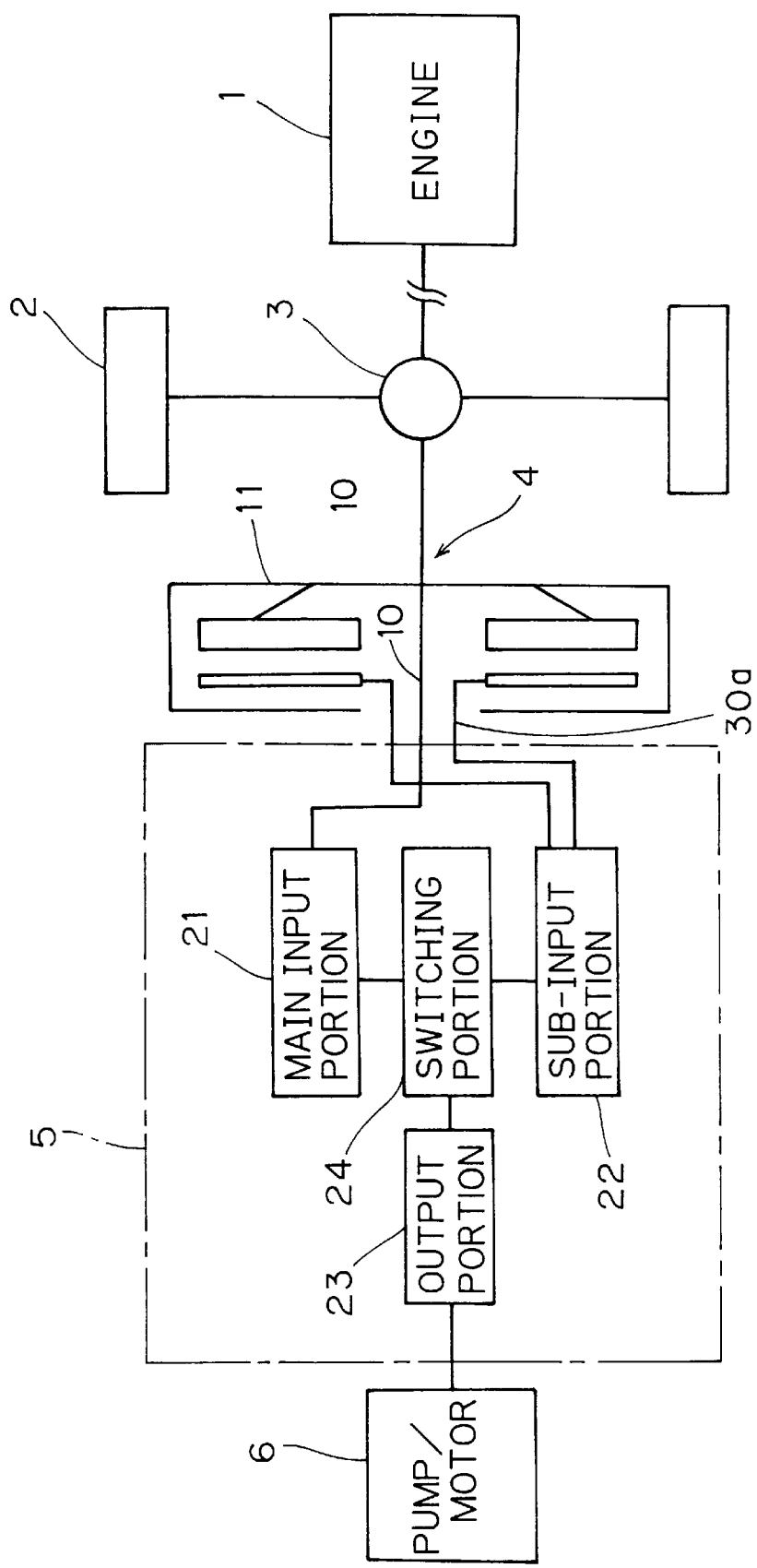
FIG. 1 is a schematic view showing a pressure accumulating hybrid vehicle in accordance with an embodiment of the invention.

FIG. 1 is a schematic view showing a pressure accumulating hybrid vehicle that includes an engine 1, tires 2 and an axle 3. In the pressure accumulating hybrid vehicle, the axle 3 is mechanically connected to an engine 1 and is configured to transmit torque to the tires 2. A hydraulic pump/motor 6 is selectively, mechanically connected to the axle 3 through a power transmission device 4 and a power switching device 5. The power transmission device 4 includes a clutch device 11, described in greater detail below. The power switching device 5 may be, for instance, a gear box with selectively inter-engaging gears. With reference to FIG. 2, hereinafter, the left side of FIG. 2 is referred to as the pump/motor side and the right side of FIG. 2 is referred to as the axle side.

The power transmission device 4 includes a drive shaft 10 which is directly mechanically connected at one end to the axle 3. The drive shaft 10 extends through the clutch device 11 to the power switching device 5.

The power switching device 5 has a main input portion 21 which is directly mechanically connected to the drive shaft 10, a sub-input portion 22 connected to an output portion of the clutch device 11 (as is described in greater detail below), an output portion 23 connected to an input portion of the hydraulic pump/motor 6, and a switching device 24 which, for torque transmission, selectively connects the output portion 23 to the main input portion 21 or, connects the output portion 23 to the sub-input portion 22, as is explained in greater detail below As shown in FIG. 2, the clutch device 11 has a power transmission member 30, a clutch disc assembly 31, a clutch cover assembly 32 provides a means for selectively engaging and disengaging torque transmission through the clutch device 11 by selectively pressing the clutch disc assembly 31 against the power transmission member 30. The clutch device 11 also includes a release mechanism 33 for controlling the engaging and disengaging action of the clutch cover assembly 32 and a housing 34 which houses the above these components of the clutch device 11.

The power transmission member 30 has a sleeve-like axial portion 30a supported about the drive shaft 10 by a bearing 35, and a disc-like flange portion 30b which extends radially outwardly from the axial portion 30a. The axial portion 30a extends into the power switching device 5 and is connected to the sub-input portion 22. Also, a frictional surface 30c is formed in the flange portion 30b.

The clutch disc assembly 31 has a boss portion 36 whose inner circumferential portion is spline-engaged with a spline portion 10a of the drive shaft 10 The clutch disc assembly 31 also includes a ring-like plate 38 fixed to the boss portion 36 by rivets 37, a frictional member 40 fixed to an outer circumferential portion of the plate 38 by rivets 39. The frictional member 40 is configured for friction engagement with the frictional surface 30c of the power transmission member 30 in response to movement of a pressure plate 41, described below.

The clutch cover assembly 32 includes the pressure plate 41, a diaphragm spring 42 and a clutch cover 43 which at least partially surrounds the diaphragm spring 42 and the pressure plate 41. The pressure plate 41 is a ring-like member and is disposed so as to confront the frictional surface 30c of the power transmission member 30 with the frictional member 40 of the clutch disc 31 disposed therebetween. The diaphragm spring 42 has a ring-like pressure portion 42a at its outer circumferential portion and a lever portion 42b at its inner circumferential portion. The diaphragm spring 42 is supported on the clutch cover 43 via stud pins 45 and two wire rings 46. The outer circumferential portion of the clutch cover 43 is fixed to an outer circumferential portion of the flange portion of the power transmission member 30 by bolts 47. The pressure plate 41 is fixed to the clutch cover 43 so as not to rotate relative to the clutch cover 43, but the pressure plate 41 may undergo limited axial movement with respect to the clutch cover 43. The clutch cover 43 and the pressure plate 41 are connected to one another by strap plates (not shown) which allow the axial movement therebetween but restrict relative rotation therebetween.

The clutch disc assembly 31 and the clutch cover assembly 32 may be of a type referred to as an automotive dry type clutch device or may be a wet type if the clutch device 11 includes a fluid sealed chamber. However, in the preferred embodiment depicted in FIG. 2, the clutch device 11 is a dry type. The outer diameter of the frictional member 40 of the clutch disc assembly 31 is smaller than that of the regular automotive dry type clutch device, with reference to the outer diameter of the drive shaft 10. In the regular automotive dry type clutch device, the diameter of the frictional members is about nine times greater than the outer diameter of the drive shaft (corresponding to the drive shaft 10 of this embodiment) This is because in other devices, the outer diameter of the frictional members is determined in accordance with predetermined engineering standards, such as safety factor relative to a maximum torque of the automotive engine.

In contrast thereto, the outer diameter of the frictional member 40 according to the present invention is set up to be three to five times greater than the outer diameter of the drive shaft 10 (more specifically, the smallest possible diameter of the drive shaft 10). Namely, the diameters meet the following equation:

(outer diameter of friction member)=3 to 5 (outer diameter of drive shaft)

Or in other words, the outer diameter of friction member divided by the outer diameter of drive shaft is equal to a number approximately between three (3) and five (5).

Therefore, a generally small size frictional member is used when compared to regular automotive dry type clutch devices. This is possible because the frictional member 40, according to the present invention, is designed only to transmit torque to rotate the sub-input portion 22 and the output portion 23 of the power switching device 5 until the rotational speed of the main input portion 21 and the output portion 23 are generally synchronized with each other, as is explained in greater detail below.

The release mechanism 33 includes sleeve-like pressure member 50 for pressing the end of the lever portion 42*b* of the diaphragm spring 42, a release bearing 51 provided around the outer circumferential portion of the pressure member 50, a piston 52 supported on the outer circumferential portion of the release bearing 51, and a spring 53 for biasing the piston 52. The piston 52 and housing 34 define a chamber 54. The piston 52 is movable in the axial direction within the housing 34 in response to pressure changes in the chamber 54. Changes in pressure in the chamber 54 are effected through a hole 55 by a control device (not shown). The spring 53 biases the piston 52 toward the power transmission member 30 Accordingly, in the case where the pressure is not supplied to the chamber 54, the pressure member 50 presses the lever portion 42*b* of the diaphragm spring 42, and the pressure contact of the frictional member 40 against the power transmission member 30 by the pressure plate 41 is released The housing 34 is supported on the drive shaft 10 by a bearing 56 such that the drive shaft 10 may rotate freely with respect to the housing 34.

The operation of the present invention is described below.

The pressure accumulating hybrid vehicle generally operates in at least three different modes. The modes are as follows: a regular travel mode in which the vehicle is powered by the engine 1; a braking mode where torque from the rotation of the tires 2 is used by the hydraulic pump/motor 6 to store energy in the form of fluid pressure; and a start mode where fluid pressure stored by the hydraulic pump/motor is used to produce torque to rotate the tires 2.

In the regular travel mode, torque from the engine 1 is transmitted to the tires 2 through the axle 3. In the regular travel mode, no pressure is supplied to the hole 55 and the chamber 54 in the clutch device 11. Accordingly, as described above, the pressure contact of the pressure plate 41 against the frictional member 40 is released and the clutch disk assembly 31 rotates freely with respect to the transmission member 30. The clutch device 11 is kept in a disengaged state in the regular travel mode. Also, in the regular travel mode, the switching device 24 is set such that the sub-input portion 22 and the output portion 23 are mechanically connected to each other. However, since the clutch device 11 is in a disengaged state, there is no torque transmission between the drive shaft 10 and the hydraulic pump/motor 6 and the hydraulic pump/motor 6 does not create any drag forces on the drive shaft 10. Further, in the regular travel mode, the switching device 24 is set such that the main input portion 21 and the output portion 23 are mechanically not connected to each other.

The pressure accumulating hybrid vehicle is supplied with a braking system (not shown). Upon engagement of the braking system, pressure accumulating hybrid vehicle operates in the braking mode. In the braking mode as the brakes are applied, pressure is simultaneously supplied to the chamber 54 of the release mechanism 33. The piston 52 moves in response to the pressure toward the axle side against the biasing force of the spring 53. In accordance with this, the pressure member 50 is also moved toward the axle side. The outer circumferential end of the diaphragm spring 42 presses the pressure plate 41 on the side of the power transmission member 30. Thus, the frictional member 40 is pressed between the power transmission member 30 and the pressure plate 41 so that the clutch device 11 is brought into the engaged state. Also, as in the regular travel mode, the switching device 24 is at first set such that the sub-input portion 22 and the output portion 23 are mechanically connected to each other.

Upon engagement of the clutch device 11, braking torque is transmitted from the tires 2 through the drive shaft 10 subsequently to the power switching device 5 through the clutch device 11. Furthermore, since the clutch device 11 is engaged, the braking torque is transmitted to the hydraulic pump/motor 6 through the sub-input portion 22, the switching device 24, and the output portion 23. The main output portion 21 fixed to the drive shaft 10 and therefore rotates at the same speed as the drive shaft 10. As the clutch device 11 becomes engaged, the sub-input portion 22 begins to rotate and eventually begins to rotate at approximately the same speed as the drive shaft 10, as does the switching device 24 and the output portion 23. Therefore, as the clutch device 11 becomes engaged, the hydraulic pump/motor 6 receives torque Once the clutch device 11 is fully engaged, due to the gearing (not shown) in the switching device 24, the switching device 24 and the output portion 23, the main output portion 21 begins to rotate at the same RPM as that of the sub-input portion 22 and the output portion 23. In other words, the rotational speeds of the main output portion 21 and the sub-input portion 22 become synchronized with each other. Once the rotational speeds of the sub-input portion 22 and the output portion 23 are synchronized, the switching device 24 is easily switched from engagement between the sub-input portion 22 and the output portion 23, to engagement between the main input portion 21 and the output portion 23. After the switching device 24 is switched, the braking torque from the tires 2 is transmitted from the main input portion 21 through the output portion 23 to the hydraulic pump/motor 6. The hydraulic pump/motor 6 serves as a pump, so that the braking torque is accumulated and stored as fluid pressure Once the switching device 24 has been switched engagement between the sub-input portion 22 and the output portion 23, to engagement between the main input portion 21 and the output portion 23, the clutch device 11 is no longer part of a torque transmission path, since the switching device 24 has been set such that there is no engagement between the sub-input portion 22 and the output portion 23. Therefore, it is not necessary for the clutch device 11 to transmit appreciable amounts of torque for lengthy periods of time, since the clutch device 11 serves only to synchronize the rotational speed of the output portion 23 and the main input portion 21.

Next, the start mode is described. In the start mode, the switching device 24 is still set such that the output portion 23 and the main input portion 21 are mechanically connected to one another For instance, as the brakes are released and motion of the vehicle is desired, the pressure accumulated and stored by the hydraulic pump/motor 6 serves as an auxiliary power source for rotating the tires 2. Torque is produced by the hydraulic pump/motor 6 using the stored fluid pressure, the torque is transmitted through the output portion 23 through the switching device 24 and to the main output portion 21 and to the drive shaft 10 In the start mode, the hydraulic pump/motor 6 serves as a hydraulic motor. The power is transmitted through the power switching device 5 directly to the drive shaft 10 and further transmitted through the axle 3 to the tires 2. In the start mode, the clutch device 11 does not contribute to the power transmission Once a predetermined speed of the vehicle is achieved, the power switching device 5 changes to the regular travel mode described above In the above described embodiment of the present inventions the clutch device 11 is used only for bringing the rotation speeds of the input/output portions in the power switching device 5 to a synchronized speed. Accordingly, the clutch device 11 may be such that it has a small torque transmission capacity, which provides reduction of the size of the device. Also, since it is possible to use a dry type clutch similar to those used in other automotive applications, the cost may be reduced.

Also, in the braking mode, since the rotation of the main input portion 21 and the output portion 23 is synchronized by use the clutch device 11 shocks and jolts normally associated with gear changing are eliminated and smooth switching by the switching device 24 may be performed.

ALTERNATE EMBODIMENTS

In the foregoing embodiment the clutch disc assembly 31 is of a rigid type in which there is no damper mechanism It is possible to use a clutch disc having a damper mechanism including a torsion spring or a hysteresis torque generating mechanism Also, the clutch disc or the clutch cover are not limited to those shown in the embodiments. Various types of automotive dry type clutch devices may be used.

As described above, according to the present invention, since it is possible to form the power transmission device using a relatively small size frictional member, the overall device may be made small in size and may be manufactured at a low cost. Furthermore, since the main input portion is connected to the output portion after the input and output of the power switching device are synchronized with each other by using the clutch device, there is a small shock in switching, and the smooth switching may be performed.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A power transmission device for a pressure actuating hybrid vehicle, comprising:

a pressure actuating hybrid vehicle having wheels supported thereon, said wheels being configured for mechanical connection to a rotary power source;

a power switching device having a main input portion, an output portion, and a switching portion, said switching portion being mechanically connected to said output portion, said switching portion being configured to selectively mechanically connect said output portion to one of said main input portion and said sub-input portion, said output portion being mechanically connectable to a hydraulic pump/motor;

a drive shaft mechanically connected to said wheels and to said main input portion of said power switching device, and a clutch device having an input and an output, said input of said clutch dece being mechanically connected to said drive shaft and said output of said clutch device connected to said sub-input portion of said power switching device;

wherein said clutch device comprises:

a power transmission member having a shaft portion connected at one end to the sub-input portion of said power switching device and a disc-like flange portion provided at the other and of said shaft portion and having a fictional surface;

a clutch disc assembly having a frictional member having an outer diameter that is at least three times greater and no more than five times greater than an outer diameter of said drive shaft, said frictional member being configured to contact the frictional surface of said power transmission member, an inner circumferential portion of the clutch disc assembly being engaged for in contact with said drive shaft for rotation therewith;

a pressure mechanism for pressing said frictional member against the frictional surface of said power transmission member; and a release mechanism for controlling the pressure of said pressure mechanism.

2. The power transmission device according to claim 1, wherein said pressure mechanism comprises:

a pressure plate arranged opposite to the frictional surface of said power transmission member with said frictional member disposed therebetween;

a biasing member for biasing said pressure plate toward said power transmission member; and a clutch cover fixed to the flange portion of said power transmission member so as to cover said pressure plate and said biasing member, said clutch cover supporting said biasing member and supporting said pressure plate to be relatively non-rotatable but movable in the axial direction.

3. The power transmission device according to claim 2, wherein said release mechanism comprises:

a spring biased against the force of said biasing member such that said pressure plate is biased toward disengagement with said clutch disc assembly; and a pressure device for selectively effecting compression of said spring to force said pressure plate into engagement with said clutch disc assembly.

4. A power transmission device for a pressure accumulating hybrid vehicle, comprising:

a clutch device having an input and an output said input of said clutch device being mechanically connectable to a drive shaft, said clutch device comprising:

a power transmission member having a shaft portion connectable to a power output member, and said power transmission member having a disc-like flange portion provide with a frictional surface;

a clutch disc assembly having a frictional member having an outer diameter that is at least three times greater and no more than five times greater than an outer diameter of the drive shaft, said frictional member having configured to contact the frictional surface of said power transmission member, an inner circumferential portion of the clutch disc assembly being engaged for in contact with the drive shaft for rotation therewith;

a pressure mechanism for pressing said frictional member against the frictional surface of said power transmission member; and a release mechanism for controlling the pressure of said pressure mechanism.

5. The power transmission device according to claim 4, wherein said pressure mechanism comprises:

a pressure plate arranged opposite to the frictional surface of said power transmission member with said frictional member disposed therebetween;

a biasing member for biasing said pressure plate toward said power transmission member; and a clutch cover fixed to the flange portion of said power transmission member so as to cover said pressure plate and said biasing member, said clutch cover supporting said biasing member and supporting said pressure plate to be relatively non-rotatable but movable in the axial direction.

6. The power transmission device according to claim 5, wherein said release mechanism comprises:

a spring biased against the force of said biasing member such that said pressure plate is biased toward disengagement with said clutch disc assembly; and a pressure device for selectively effecting compression of said spring to force said pressure plate into engagement with said clutch disc assembly.

* * * * *